July 9, 1940.　　　　C. W. VOGT　　　　2,206,984
DISPENSING RECEPTACLE
Filed Nov. 6, 1936　　　2 Sheets-Sheet 1
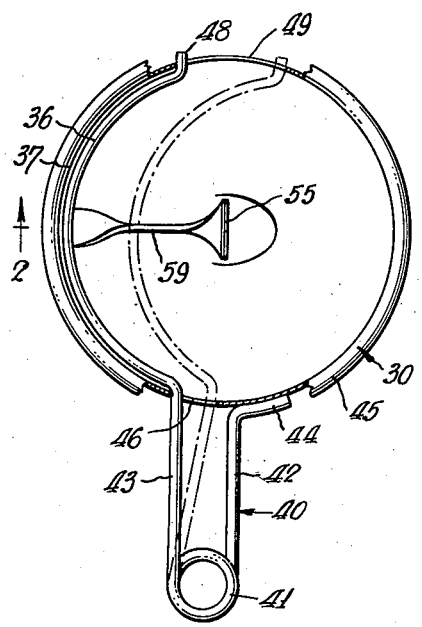
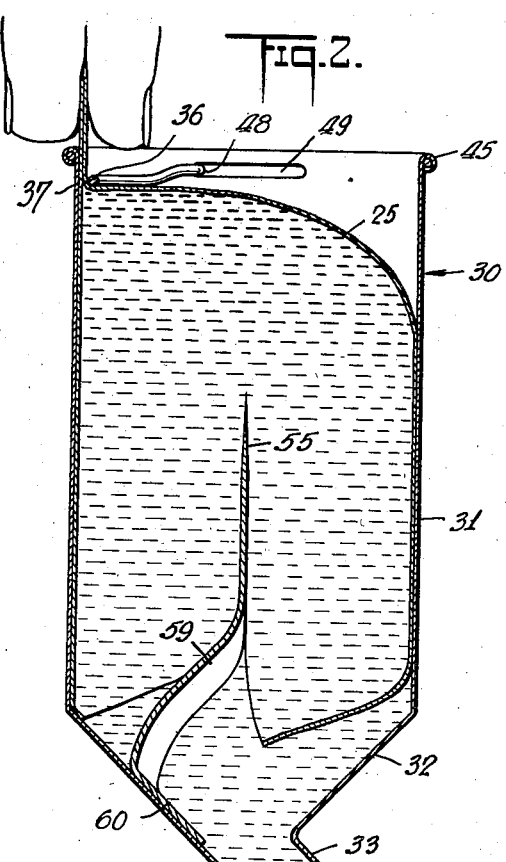
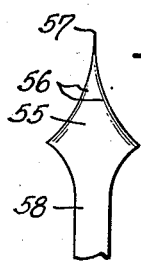
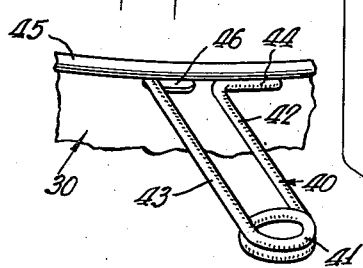
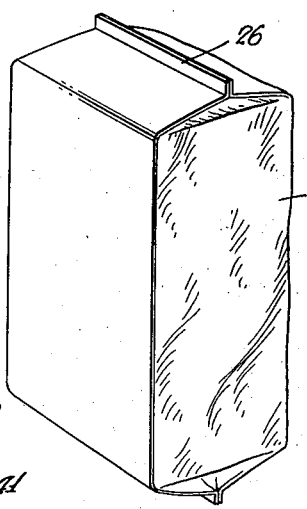
INVENTOR
*Clarence W. Vogt*
BY
ATTORNEYS July 9, 1940.     C. W. VOGT     2,206,984
DISPENSING RECEPTACLE
Filed Nov. 6, 1936     2 Sheets-Sheet 2
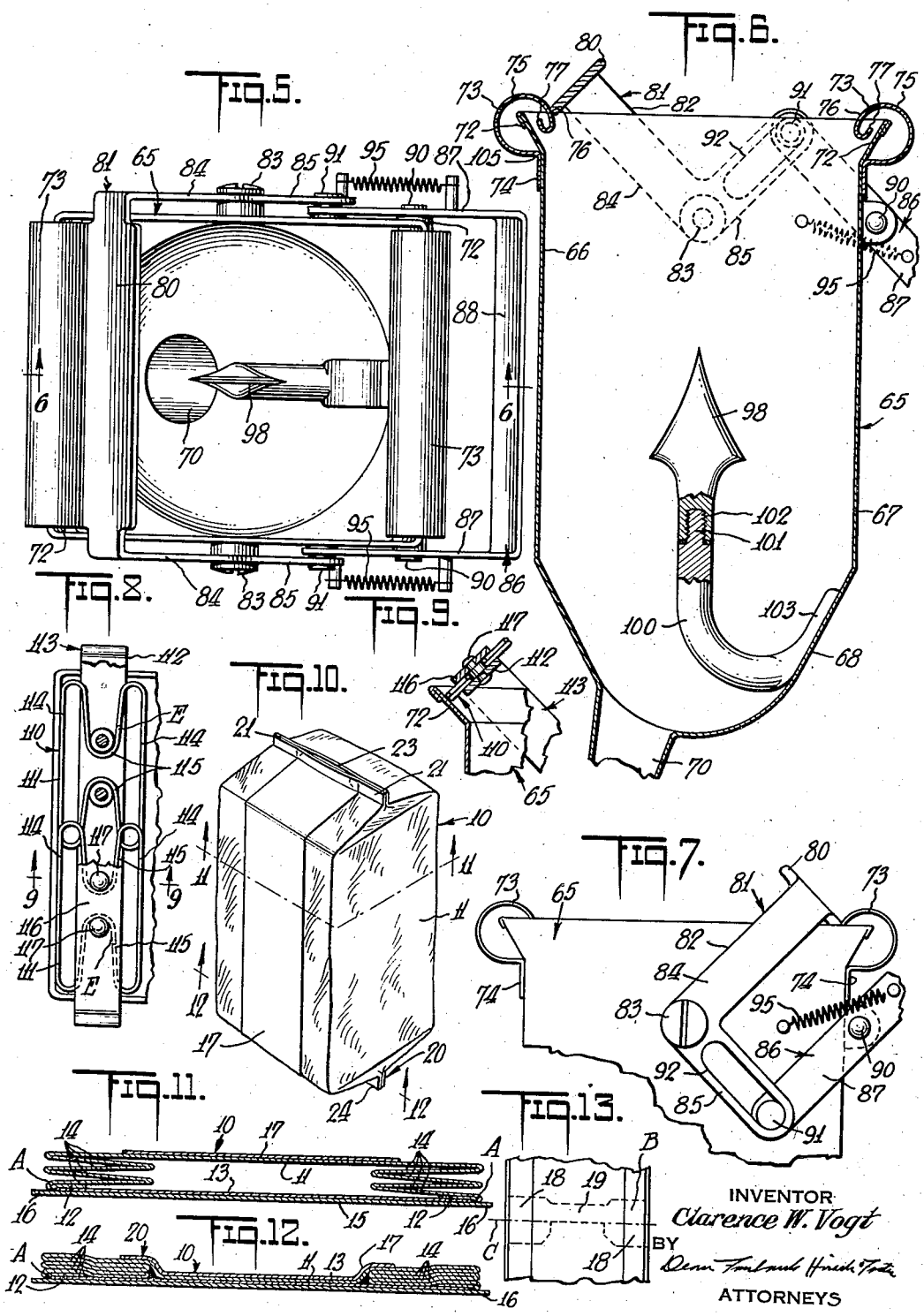
INVENTOR
Clarence W. Vogt
BY
ATTORNEYS Patented July 9, 1940

2,206,984

UNITED STATES PATENT OFFICE 2,206,984

DISPENSING RECEPTACLE

Clarence W. Vogt, Saugatuck-Westport, Conn., assignor by mesne assignments, to Owens-Illinois Glass Company, Toledo, Ohio, a corporation of Ohio Application November 6, 1936, Serial No. 109,428

31 Claims. (Cl. 221—23)

In draining lubricating oil from a container into a suitable receiver such as the crankcase of an automobile engine, or into any other casing containing parts to be lubricated, it is customary to insert a funnel into the conduit leading into the crankcase, and to pour the contents of said container into said funnel. Although the major portion of the oil will promptly drain from the container, a small portion thereof, due to its viscosity, adheres to the inner walls of said container, and is slow in reaching the outlet of said container. Therefore, in order to assure a more complete emptying of the container, it is necessary to hold said container in inverted draining position for a comparatively long period of time. In the servicing of automobiles at ordinary filling stations, such delay in the draining of the oil containers is not practical and there is a considerable loss due to the residual oil left as a film on the inner walls of the container. This varies with the temperature and the character of the oil.

If a flexibly walled container is used, the walls of this container collapse and come together as its contents drains out, thereby slowing up the rate of discharge of said contents towards the end of the draining period.

One object of the present invention is to provide a device whereby a flexibly walled container may be quickly emptied and stripped of its entire liquid contents by a simple manipulation.

In carrying out the present invention, I provide a funnel or other dispensing receptacle presenting a platen surface and supporting a pressure member adapted to collapse and press a flexible container in said funnel against said platen surface so that said container, while or after emptying into said funnel, may be drawn out of the funnel between said pressure member and said platen surface, and stripped of any oil which may adhere to the walls of said container. The pressure member and the platen surface are resiliently pressed together and relatively yieldable to facilitate the operation of drawing the collapsed container out of the funnel.

Various other objects, features and advantages of the invention will be apparent from the following particular description and from an inspection of the accompanying drawings. In these drawings—

Fig. 1 is a top plan view, partly in section, of one embodiment of the present invention, Fig. 2 is a section taken on the line 2—2 of Fig. 1, and showing a flexible container draining into the funnel and in the process of being stripped.

Fig. 3 is an elevation of the device for puncturing the flexible container,

Fig. 4 is a perspective view of the handle portion of the device of Fig. 1,

Fig. 5 is a top plan view of another embodiment of the present invention,

Fig. 6 is a section taken on the line 6—6 of Fig. 5,

Fig. 7 is a side elevation of the upper portion of the funnel of Fig. 5, but showing the stripping device in a different operating position, Fig. 8 is a top plan view of a portion of another form of stripping device embodying the present invention, parts of said device being shown broken away, Fig. 9 is a section taken on the line 9—9 of Fig. 8, Fig. 10 is a perspective view of a form of flexible liquid container which may be used in conjunction with the present invention, Fig. 11 is a section taken on the line 11—11 of Fig. 10, but showing the container partially collapsed, Fig. 12 is a section taken through the bottom seam of the container, on the line 12—12 of Fig. 10, Fig. 13 shows a plan view of a portion of a continuous tube after being transversely sealed, and during the process of being formed into the individual containers of Fig. 10, and Fig. 14 is a perspective view of another form of flexible liquid container which may be used in conjunction with the present invention.

In Figs. 10 to 13 is shown a form of flexible oil container 10 which may be used in conjunction with the present invention, and which is more fully disclosed and claimed in a copending application, but it must be understood that any other type of flexibly walled container may be used for the purpose of the present invention. In the form shown, the bag is made from thin flexible sheet material in strip form, which is progressively collapsed and sealed transversely at spaced points along the length thereof, and which is then transversely cut intermediate of the ends of the sealed portion to form a complete hermetically sealed collapsed bag 10.

The bag 10 is formed primarily of impervious flexible sheet material which may be sealed by heat and pressure, or by the use of adhesives or solvents. For instance, it may be material sold under the name of "Pliofilm," which is made from a chlorinated rubber compound, and which is thermoplastic and readily vulcanized or sealed at a temperature of approximately 115° C., so that overlapping sections thereof may be sealed together by the application of heat and pressure.

The bag 10 is formed of a sheet 11 of Pliofilm or other material referred to, having its side sections 12 heat sealed to the sides of a narrower sheet of Pliofilm 13 along its entire length to form a tube. The sheet 11 is tucked inwardly from the sides of the sheet 13 to form a pair of infolds 14 on each side of the collapsed bag. These infolds 14 are narrow so that the inner fold edges of one pair of infolds do not abut or overlap the inner edges of the opposite pair of infolds, but are spaced a substantial distance from the longitudinal axis of the bag.

Cemented or otherwise secured to the Pliofilm sheet 13 to form a laminated wall therewith, is a reenforcing sheet 15 made of paper or other flexible sheet material which will not be injuriously affected by the application of sufficient heat and pressure to effect sealing, fusing or vulcanizing of the Pliofilm. In order that the corner of the bag 10 along the side edges of the sheet 15 be strong when in fully charged condition, said sheet 15 extends beyond the side edges of the Pliofilm sheet 13 to form marginal extensions 16, and portions of the side sections 12 of the Pliofilm sheet 11 project outwardly beyond the side edges of said sheet 13, and are directly glued or cemented at A to said marginal extensions. Such sealing by adhesive and by attachment to the sheet 11 directly to the paper sheet 15 at the corners, has a reenforcing effect which will compensate for any weakening resulting from heating and softening of the Pliofilm at the corners.

Cemented or otherwise secured to the Pliofilm sheet 11 is a strip of paper 17 serving the purpose hereinafter referred to.

In the formation of the bag shown in Fig. 10, the continuous tube, in collapsed condition shown in Fig. 13, is sealed transversely thereacross over an area B comprising side sections 18 interconnected by a section 19 of reduced width. The sealed portion of the tube is cut transversely along the lower edge of the section 19 on the line C, so that the portion of the sealed area B above the line C forms the bottom seal 20 across the entire width of the bag 10 as shown in Fig. 12, while the portion of the sealed area below the line C forms side seals 21 in the top of the next succeeding bag, the portion of said latter bag between said side seals 21 forming an opening through which said latter bag may be charged. After the bag has been charged with its required contents, the opening thereof is permanently sealed by heat sealing together the facing Pliofilm linings of said opening.

The sealing across the tube as shown in Fig. 13 is effected by heat and pressure, and causes all of the superposed layers of the Pliofilm sheets to be autogenously bonded together and bonded to the paper sheets 15 and 17 as shown in Fig. 12. The seam at the bottom of the bag will consist of two thicknesses of Pliofilm sealed together at the center, and seven thicknesses of Pliofilm sealed at the side edges.

Since the sealing across the tube is effected by a single heat sealing operation, non-uniformity in the number of overlapping Pliofilms across the width of the collapsed tube would cause the overheating of the center portion of the tube or the underheating of the side section. In order to overcome this condition, the paper sheet 17 is provided across the center portion of the tube and extends slightly beyond the inner edges of the side seals.

When the bag 10 is full and sealed, it will have a square cross-section as shown in Fig. 10, and its top seam will form a flap 23, and its bottom a flap 24.

In Fig. 14 is shown another form of flexible oil container which may be used in conjunction with the present invention, and which is disclosed in my copending application Serial No. 74,424, filed April 15, 1936. In this form, the container comprises a flexibly walled bag 25 similar in shape to the bag 10 of Figs. 10–13, but laminated throughout with reenforcing paper sheet material. The bag 25 is provided at the upper end with a transverse seam in the form of a flap 26.

In the specific form of the invention shown in Figs. 1–4, there is provided a funnel 30 having a cylindrical body portion 31 and having a conical base portion 32 tapering into an outlet tube 33 which may be inserted directly into the inlet conduit of an automobile crankcase or of any other lubricant receiver, or which may be connected to a flexible hose 34 in any suitable manner as for instance by a bayonet joint coupling 35 for discharge into such a receiver.

Extending in the interior of the funnel 30 is a pressure member 36 spring-pressed against a platen surface 37 on the inner periphery of the funnel by a spring 40 serving as a handle for said funnel. The pressure member 36 and the spring 40 are made from a single length of spring wire forming a spring loop 41 terminating in a pair of spaced arms 42 and 43 forming the side members of said handle. The outer end of the arm 42 is permanently secured to the funnel 30 and for that purpose is provided with a transverse extension 44 secured to the wall of said funnel below the beaded rim 45 of the latter by soldering or other suitable means. The other arm 43 extends loosely through an elongated slot 46 in the wall of the funnel 30 and is then bent to conform with the inner periphery of the funnel 30 opposite the platen surface 37 to form the pressure member 36.

The outer end of the pressure member 36 is supported in the funnel 30 and for that purpose is provided with an extension 48 passing loosely through an elongated slot 49 in the wall of the funnel. The pressure member 36 is advantageously offset downwardly from its ends, so that any oil that finds its way to the offset ends of said pressure member will not flow outwardly through the elongated slots 46 and 49.

The pressure member 36 may be moved into the position shown in dotted lines in Fig. 1, and against the action of the spring loop 41, merely by squeezing the two arms 42 and 43 together. When the squeezing pressure is released on these two arms, the pressure member 36 will return to its normal position shown in full lines in Fig. 1.

In order that the flexible container may be easily opened to form a pouring hole through which the contents thereof may be drawn, there is provided a suitable puncturing device extending centrally of the funnel 30. As shown, this puncturing device includes a knife 55 having a pair of opposed cutting edges 56 which taper towards a piercing point 57, and which are preferably concave to present an elongated piercing end. The knife 55 is shown made from a single flat bar forming a shank 58 which is advantageously provided with a twisted section 59 so that the slit in the container formed by the knife 55, will be spread open by said twisted section to provide a larger opening through which the contents of the container may be discharged. This puncturing device may be secured to the funnel by any suitable means, as for instance by soldering the end 60 of the shank to the base portion 32 of the funnel 30.

In using the device, the funnel 30 is grasped by the spring handle 40 and inserted into the conduit leading into the crankcase. The container filled with oil as shown in Figs. 10 or 14, is then dropped into the funnel with enough pressure or impact to cause the puncturing device 55 to cut an opening at the bottom of said container, so that the contents thereof will drain out of the container and through the funnel into the crankcase. Before, during or after this draining operation, the two side arms 42 and 43 of the spring handle 40 are pressed together to move the pressure member 36 away from the inner periphery of the funnel and into the dotted position shown in Fig. 1. The upper end of the bag is inserted between said stripping member and said inner periphery. The grasping of the flaps 23 or 26 of the bag permits this positioning of the container. The hand pressure on the spring handle 40 is then released to permit the pressure member 36 to return to its normal position shown in Fig. 1. The flaps 23 or 26 may then be grasped between the fingers and the container drawn upwardly. The combined drawing action and the spring pressure action of the pressure member 36 causes the stripping of the container and the forcing out of its entire contents, including that which would ordinarily adhere to its walls as a film of substantial thickness, so that the residue in the container is reduced to a minimum. This drawing operation may be effected while the container is still partially filled, as shown in Fig. 1, so that its contents is forced out at a greater speed, or may be effected after the major portion of the contents of the bag is drained out and the only portion remaining is that which has adhered to the walls of the container.

In the construction shown in Figs. 5–7, the funnel 65 has a body portion 66 which is of rectangular cross-section at its upper end to receive a correspondingly shaped flexibly walled container such as the container 10 or 25, and which merges into a cylindrical portion 67 at its lower end. Connected to the bottom of this cylindrical portion 67 is a cup-shaped section 68 having an outlet conduit 70 through which the contents of the container may be poured into a suitable lubricant receiver.

A pair of opposed walls of the funnel 65 are respectively provided at their upper ends with lips 72 extending obliquely and outwardly with respect to these walls. Partially encircling each of these lips 72 is a spring plate 73 having a flange portion 74 soldered or otherwise secured to the wall of the funnel, and having a curved portion 75 encircling the upper edge of said lip and presenting a platen surface 76 against which the flexible bag may be collapsed. In order to prevent the free edge 77 of the plate 73 from catching the container as it is drawn out of the funnel, said free edge is wound spirally inwardly as shown in Fig. 6.

Adapted to cooperate alternately with the platen surfaces 76 is a pressure member 80 forming the crosspiece of a yoke 81 straddling the upper end of the funnel 65. This yoke 81 has a pair of similar side pieces 82 in the form of bell cranks pivotally connected to the sides of the funnel 65 by pivot pins 83, and each comprising an arm 84 connected to an end of the pressure member 80, and an arm 85 at right angles to said arm 84.

In order to swing the yoke 81 about its pivotal pins 83, there is provided a U-shaped lever 86 having a pair of side arms 87 which are interconnected by a cross bar 88 and which are pivoted to the funnel by means of pivot pins 90. These lever arms 87 carry at their outer ends the roller pins 91 passing through elongated slots 92 in the bell crank arms 85. The lever 86 is so constructed and so positioned with respect to the yoke 81 that the lever arms 87 will be at right angles to the yoke arms 85 in either one of its stripping positions, and the lengths of the slots 92 are such that in either of these positions the roller pins 91 will be at the outer ends of said slots 92 so that the yoke 81 will be locked in said positions.

As shown in the construction of Fig. 6, the pressure member 80 is locked into stripping position with respect to the platen surface 76 on the left-hand side of the funnel. In order to move the pressure member 80 into cooperation with the other platen surface 76, the lever 86 is swung in counterclockwise direction about its pivotal connections 90. This movement of the lever 86 causes the yoke 81 to swing in a clockwise direction about its pivotal connections 83 until the pressure member 80 presses against the platen surface 76 on the right-hand side of the funnel, as shown in Fig. 7.

In order to further assure the locking of the pressure member 80 in either one of its two stripping positions, there may be provided coil springs 95 connected at their ends to the funnel and to the lever arms 87 respectively, and extending below the pivot pins 90 in the stripping position shown in Fig. 6, or above said pins in the other stripping position shown in Fig. 7.

The puncturing device in the construction of Figs. 5–7 includes a knife head 98 which is similar in shape to the knife head 55 or Figs. 1–4 but which is detachably connected to a shank 100 so that said knife head 98 may be easily removed from the funnel and sharpened when necessary. For that purpose, this shank 100 is provided with a stud 101 at its outer end threaded into a socket 102 in the knife head 98. The shank 100 may comprise a round bar having one end 103 flattened for attachment by soldering or other manner to the bottom of the funnel, the roundness of said shank serving to open up the slit in the container formed by the knife head 98.

In the operation of the device shown in Figs. 5–7 the pressure member 80 will be in one of its extreme stripping positions from a previous stripping action, and in such position the upper end of the funnel 65 will have an opening sufficient to permit a container to be dropped into the funnel. The container is dropped into the funnel 65 with its upper seam flap extending substantially parallel to the pressure member, and with enough pressure or impact to cause the puncturing device 98 to cut an opening at the bottom of said container so that the contents thereof will drain out of the container and into the funnel. Before, during or after this draining operation, the upper portion of the bag is drawn above the upper end of the funnel, and the lever 86 is operated as already indicated to swing the pressure member 80 from its previous stripping position adjacent to one spring plate 73 into its other stripping position against the other spring plate 73, so that said upper end of the container will be collapsed and pressed against said latter spring plate.

The funnel is preferably of such a size that the container, even when entirely drained, will have at least its upper seam edge or flap extending beyond the upper edge of the funnel, so that no manipulation of the bag itself will be necessary to collapse the container against the platen surface.

After the container has been collapsed between the pressure member 80 and a spring plate 73, the upper seam flap of the container is then grasped between the fingers and the container drawn upwardly. During this drawing operation the funnel 65 is held down in draining position by grasping the periphery of the funnel, or a handle may be provided on the funnel for that purpose. The combined drawing action and the pressure action of the pressure member 80 causes the stripping of the container and the forcing out of its entire contents. The spring plates 73 are resiliently yieldable about the inner edges 105 of their flanges 74 so that said spring plates will be spring-pressed against the pressure member 80 during the drawing operation. The free ends 77 of the spring plates 73 cooperate with their associated lips 72 to limit the extent to which these spring plates will yield.

After the drawing and stripping operation is completed, the next stripping action on a succeeding container is effected by reversing the operation referred to.

In the construction shown in Figs. 8 and 9, the pressure member 110 comprises a pair of spring wires 111 supported on the cross bar 112 of a yoke 113 similar to the yoke 81 in the construction of Figs. 5 to 7, and similarly swingable over the upper end of the funnel 65 into one of two stripping positions. Each of these spring wires 111 is bent to form a pair of straight, substantially parallel side sections 114 and a pair of intermediate inwardly bent sections 115, the ends of said wires being cut obliquely and overlapping as at E. The two spring wires 111 are arranged on the cross bar 112 with the straight side sections 114 of one wire in alignment with the straight sections 114 of the other wire, and are wide enough so that these straight side sections extend beyond the side edges of said cross bar.

The spring wires 111 are clamped between the cross bar 112 and a flat bar 116, and are held against sidewise displacement with respect thereto by shoulder rivets 117 extending through the intermediate turns of said wires and between said bars. The distance between these bars 112 and 116 is such as to permit the yielding of the springs 111 during stripping action.

Since the pressure member 110 has yieldable resilient action of its own, the spring plates 73 of Figs. 5–7 may be eliminated and said pressure member made to act directly on the lips 72 as shown in Fig. 9.

Having thus described my invention, what I claim as new and desire to secure by Letters Patent is:

1. A device for discharging the contents of a flexible container, including a receptacle, an elongated member within said receptacle and substantially following a portion of the inner periphery of said receptacle for holding said container against said inner periphery, and spring means for urging said member against said inner periphery, said spring means being manipulable to move said member away from said inner periphery to permit a portion of the flexible container to be positioned between said member and said inner periphery.

2. A device for stripping a flexible container of its liquid contents, including a receptacle, a pressure member within said receptacle for holding the flexible container against the inner periphry of said receptacle, and a spring handle connected to said receptacle and resiliently urging said member against said inner periphery.

3. A device for stripping the liquid contents from a flexible container, including a receptacle, and a spring wire convoluted to form a spring handle for said receptacle, and a spring-pressed stripping member within said receptacle and extending along a portion of the inner periphery of said receptacle.

4. A device for stripping the liquid contents from a flexible container, including a receptacle having a wire extending along a circumferential portion of the inner periphery thereof, and means for resiliently urging said wire against said inner periphery.

5. A device for stripping the liquid contents from a flexible container, including a receptacle, a stripping member within said receptacle and extending along a portion of the inner periphery of said receptacle, means for resiliently urging said stripping member against said inner periphery, and hand operable means for moving said stripping member away from said inner periphery against the action of said means.

6. A device for stripping the liquid contents from a flexible container, including a receptacle, a container puncturing device within the lower portion thereof, and adjacent to the outlet end of said receptacle, and a member in the interior of said receptacle cooperating with a portion of the inner periphery thereof for pressing the flexible container against said inner periphery whereby upon drawing of said container said container will be stripped of its entire contents.

7. A device for stripping the liquid contents from a flexible container, including a receptacle, and a resilient wire connected to said receptacle and convoluted to form a spring loop on the outside of said receptacle, a pair of spaced sections extending from said spring loop and serving with said spring loop to form a handle for said receptacle, and a stripping section extending from one of said spaced sections and along a portion of the inner periphery of said receptacle, and serving to support the upper end of said container against said inner periphery during discharge of the contents of the container into the receptacle.

8. A device for discharging the contents of a flexible container, including a receptacle, a pair of spaced platen surfaces on said receptacle, and means supported on said receptacle for collapsing the container against either one of said platen surfaces.

9. A device for discharging the contents of a flexible container, including a receptacle having a substantially rectangular cross-section at its upper end, a pair of platen surfaces on opposite sides of said receptacle near said upper end, and a pressure member supported for movement into stripping position with respect to either one of said platen surfaces.

10. A device for discharging the contents of a flexible container, including a receptacle, a platen surface on said receptacle, and a yoke straddling the upper end of said receptacle and pivoted to said receptacle for movement into stripping position with respect to said platen surface or away from said platen surface.

11. A device for discharging the contents of a flexible container, including a receptacle, a pair of spaced platen surfaces on said receptacle, and a yoke straddling the upper end of said receptacle and pivoted to said receptacle, said yoke having a pressure member adapted to be moved into stripping position with either one of said platen surfaces.

12. A device for discharging the contents of a flexible container, including a receptacle, a pair of platen surfaces on said receptacle, a pressure member supported on said receptacle, means for moving said pressure member into stripping position with respect to either one of said platen surfaces, and means for locking said pressure member in either one of its stripping positions.

13. A device for discharging the contents of a flexible container, including a receptacle, a platen surface on said receptacle, a yoke straddling the upper end of said receptacle, and comprising a pair of bell cranks pivotally connected to said receptacle, and a pressure member interconnecting said bell cranks, and lever means pivotally connected to said receptacle for operating said bell cranks to move said pressure member towards or away from said platen surface.

14. A device for stripping a flexible container of its liquid contents, including a receptacle, a platen surface on said receptacle, and a pressure member in the form of a wire spring movable into stripping position with respect to said platen surface.

15. A device for discharging the contents of a flexible container, including a receptacle having an opening at the top to receive said container, a platen surface on said receptacle, and a pressure member supported on said receptacle and movable away from said platen surface to permit insertion of a portion of said container therebetween through said opening and movable toward said platen surface to collapse said container as it is pulled between said surface and said member.

16. A device for discharging the contents of a flexible walled container, including a receptacle having an open top through which said flexible walled container may be inserted, a container puncturing member supported within said receptacle, and a pair of members relatively movable transversely of the receptacle adjacent to the upper end and adapted to receive therebetween the upper portion of said container and to strip the contents from said container as the latter is moved upwardly between said members.

17. In a dispenser for liquid packages having a container provided with a dispensing opening, means in said container for effecting an opening into said package, and means for squeezing and collapsing the walls of said packages progressively as it is being withdrawn from said container, said means comprising a substantially fixed member and a member movable relative thereto between which a portion of said package is squeezed, and means for forcing said movable member against a portion of said package whereby to squeeze it between said members.

18. A dispenser for liquid packages, including a receptacle provided with a dispensing opening, means in said receptacle for rupturing said package to open the same, and means for squeezing and collapsing the walls of said package as it is being withdrawn from said receptacle comprising a pair of relatively movable members between which said package is squeezed, and means for moving said members relatively towards each other and against said package whereby said package is squeezed between said members.

19. A dispenser for liquid packages, including a receptacle provided with a dispensing opening, means in said receptacle for puncturing said package to open the same, means for squeezing and collapsing the walls of said package as it is being withdrawn from said container comprising a substantially fixed member and a member movable relative thereto between which said package is withdrawn, means for moving said movable member toward said fixed member to exert a squeezing force on said package, and a handle secured to said receptacle and so located with respect to said squeezing means as to enable the user of the dispenser to hold said handle with one hand, while moving with said hand said movable member with respect to said fixed member.

20. A dispenser for liquid packages, including a receptacle provided with a dispensing opening, means in said receptacle for puncturing said package to open the same, and means for squeezing and collapsing the walls of said package as it is being withdrawn from said receptacle comprising a frame pivotally connected to the upper part of said receptacle and having a member mounted thereon, a second member, said members being relatively movable and adapted to squeeze and collapse the walls of said package therebetween as it is being withdrawn from said receptacle, said frame being springable about its pivotal connection to permit the insertion of the package into said receptacle and between said members.

21. In a dispenser for liquid packages having a receptacle provided with a dispensing opening, means in said receptacle for fracturing said package to open the same, means for squeezing and collapsing the walls of said package as it is being withdrawn from said receptacle comprising a substantially fixed member and a pivotally mounted member, and spring means normally urging one of said members against the other.

22. A device for discharging the contents of a flexible walled container including a receptacle for receiving said container and open at its upper end, a platen surface mounted on said receptacle, a pressure member also mounted on said receptacle and adapted to cooperate with said platen surface to collapse and squeeze a punctured container against said platen surface while permitting said container to be drawn outwardly from the open end of said receptacle, and means for angularly moving said pressure member away from said platen surface to permit the insertion of the container into said receptable through said open end and between said platen surface and said pressure member.

23. A device for discharging the contents of a flexible walled container including a receptacle, a platen surface on said receptacle, a pressure applying member also on said receptacle adapted to collapse and squeeze a punctured container against said platen surface, a finger piece mounted on said receptacle, and operating means between said finger piece and said pressure applying member for moving said pressure applying member away from said platen surface and transversely of the receptacle upon the operation of said finger piece.

24. A device for discharging the contents of a punctured flexible walled container including a receptacle, a platen surface on said receptacle, and a pressure member also on said receptacle, and movable away from said platen surface transversely of said receptacle to permit insertion of a portion of said container therebetween and movable towards said platen surface transversely of said receptacle to collapse said container as it is being pulled out of the receptable between said surface and said member.

25. A device for discharging the contents of a flexibly walled container, including a receptacle, a platen surface on said receptacle, a pressure applying member adapted to collapse and squeeze a punctured container against said platen surface, a handle on said receptacle, a thumbpiece accessible to the hand which holds said handle, and means responsive to the operation of said thumbpiece for moving said pressure applying member with respect to said platen surface.

26. A device for discharging the contents of a flexible walled container, including a receptacle for receiving said container, a knife near the bottom of said receptacle, and means in and near the top of said receptacle for gripping and supporting the upper end of the container during draining of the latter.

27. A device for discharging the contents of a flexible walled container, including a receptacle for receiving said container, means for puncturing the lower end of the container during the lowering movement of the container into the receptacle, and means in said receptacle for stripping the contents from said container during the upward movement of the container out of the receptacle.

28. A device for discharging the contents of a flexible walled container, including a receptacle having an opening at the top to receive said container, a platen surface on the upper portion of said receptacle, and a pressure member pivotally supported on said receptacle and movable away from said platen surface to permit insertion of a portion of said container therebetween and movable toward said platen surface to collapse said container as it is pulled out of the receptacle between said surface and said pressure member.

29. A device for discharging the contents of a flexibly walled container, including a receptacle for receiving said container, means on said receptacle for stripping said container of its contents, comprising a pair of members between which said container is squeezed, relatively movable along a direction towards and away from each other, a finger piece on said receptacle, and means responsive to the operation of said finger piece for moving said members relatively along said direction.

30. A device for discharging the contents of a flexible container, including a receptacle open at the top, a platen surface on said receptacle, and means for squeezing and collapsing the walls of said container as it is being withdrawn from said receptacle, comprising a pair of relatively movable members between which said package is squeezed, and means for moving said members relatively towards each other and against said container, whereby said container is squeezed between said members.

31. A device for discharging the contents of a flexible container, including a receptacle open at the top, a platen surface on said receptacle, and means for squeezing and collapsing the walls of said container as it is being withdrawn from said receptacle, comprising a pair of members between which said container is squeezed, movable relatively towards each other and against said container to collapse said container, and spring means urging one of said members against the other in container collapsing position of said members.

CLARENCE W. VOGT.